United States Patent
Ouyang et al.

(10) Patent No.: US 9,164,232 B2
(45) Date of Patent: Oct. 20, 2015

(54) TE-POLARIZATION SPLITTER BASED ON PHOTONIC CRYSTAL WAVEGUIDE

(71) Applicant: SHENZHEN UNIVERSITY, Shenzhen, Guangdong (CN)

(72) Inventors: Zhengbiao Ouyang, Shenzhen (CN); Xin Jin, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 14/372,027

(22) PCT Filed: Jan. 9, 2013

(86) PCT No.: PCT/CN2013/070257
§ 371 (c)(1),
(2) Date: Jul. 14, 2014

(87) PCT Pub. No.: WO2013/104307
PCT Pub. Date: Jul. 18, 2013

(65) Prior Publication Data
US 2014/0355928 A1     Dec. 4, 2014

(30) Foreign Application Priority Data
Jan. 13, 2012   (CN) .......................... 2012 1 0064949

(51) Int. Cl.
| | |
|---|---|
| *G02B 6/122* | (2006.01) |
| *G02B 6/126* | (2006.01) |
| *G02B 6/10* | (2006.01) |
| *B82Y 20/00* | (2011.01) |
| *G02B 6/27* | (2006.01) |
| *G02B 6/12* | (2006.01) |

(52) U.S. Cl.
CPC ................ *G02B 6/126* (2013.01); *B82Y 20/00* (2013.01); *G02B 6/1225* (2013.01); *G02B 6/2773* (2013.01); *G02B 2006/1215* (2013.01)

(58) Field of Classification Search
CPC ......... G02B 6/126; G02B 6/122; G02B 6/122
USPC ..................................................... 385/11, 129
See application file for complete search history.

(56) References Cited

U.S. PATENT DOCUMENTS

| 7,054,524 B2 * | 5/2006 | Miller ............................. 385/28 |
| 7,082,235 B2 * | 7/2006 | Gunn, III ........................ 385/28 |

(Continued)

FOREIGN PATENT DOCUMENTS

| CN | 101126828 A | 2/2008 |
| CN | 101887145 A | 11/2010 |
| JP | 2001-174659 A | 6/2001 |

(Continued)

OTHER PUBLICATIONS

International Search Report of PCT Patent Application No. PCT/CN2013/070257 issued on Apr. 18, 2013.

*Primary Examiner* — Kaveh Kianni

(57) ABSTRACT

The present invention discloses a TE-polarization splitter based on a photonic crystal waveguide, comprising a waveguide formed in a photonic crystal with a complete photonic bandgap, wherein after the incident wave with any polarization direction is inputted into the polarization splitter via the input port of the photonic crystal waveguide, TE wave is outputted from the output port of the polarization splitter, while the TM wave is reflected from the input port of the polarization splitter. The structure of the present invention has a small volume, high degree of polarization, high light transmission efficiency, and it is suitable for large-scale optical integrated circuits and can realize the polarization beam splitting function for different wavelengths.

5 Claims, 4 Drawing Sheets

(56) References Cited

U.S. PATENT DOCUMENTS

| | | |
|---|---|---|
| 7,406,239 B2 * | 7/2008 | Ouderkirk et al. ............ 385/131 |
| 7,738,763 B2 * | 6/2010 | Ouderkirk et al. ............ 385/141 |
| 2008/0124037 A1 * | 5/2008 | Noda et al. .................... 385/129 |
| 2009/0232441 A1 * | 9/2009 | Noda et al. .................... 385/11 |

FOREIGN PATENT DOCUMENTS

JP      2001-175659 A      6/2001

* cited by examiner

TE- POLARIZATION SPLITTER BASED ON PHOTONIC CRYSTAL WAVEGUIDE

FIELD OF THE INVENTION

The invention relates to the field of micro optical polarization splitter, in particular, to a tiny optical polarization splitter based on photonic crystal technology.

BACKGROUND OF THE INVENTION

Conventional polarization splitters are large in volume, and can not be used in the optical integrated circuits. However, micro optical devices including polarization splitters can be manufactured based on photonic crystals. Up to now, there are two methods, one of which is that a photonic crystal with a TE photonic bandgap and a TM transmission band, or a TM photonic bandgap and a TE transmission band are used to achieve the polarization separation of waves. This kind of polarization splitters can only be used as separate photonic crystal devices, since the transmittance and degree of polarization are poor, and it is difficult to integrate them into other photonic crystal devices. The other is that different relative coupling lengths are designed in order to couple light waves with different polarization states into different waveguides by means of long-distance coupling between waveguides, utilizing the method of the periodic coupling and odd-even state alternation between the waveguides. The polarization splitters obtained by the two methods above, although the volume thereof has been much smaller than that of conventional polarization splitters, still have a relative large volume.

SUMMARY OF THE INVENTION

The object of the present invention is to overcome the shortcomings in the prior arts, and to provide a TE-polarization splitter based on a photonic crystal waveguide formed in a photonic crystal with a complete photonic bandgap, to be convenient for integration with high efficiency and a small dimension.

The object of the present invention is realized through the following technical schemes.

The TE-polarization splitter based on a photonic crystal waveguide according to the present invention includes a waveguide formed in a photonic crystal with a complete photonic bandgap, wherein after the incident wave with any polarization direction is inputted into the polarization splitter via the input port of the photonic crystal waveguide, TE wave is outputted from the output port of the polarization splitter, while the TM wave is reflected from the input port of the polarization splitter.

Dielectric defect rods are arranged in the photonic crystal waveguide, the refractive index for the e-light is more than that for the o-light in the dielectric defect rods in the waveguide, and the optical axis of the dielectric defect rods in the waveguide is parallel to the photonic crystal waveguide plane and orthogonal to the propagating direction of the wave.

The number of the dielectric defect rods in the waveguide is 1 or 2 or 3 or 4 or 5 or 6.

The photonic crystal waveguide is a two-dimensional photonic crystal waveguide, and includes a two-dimensional photonic crystal waveguide with tellurium dielectric material, a two-dimensional photonic crystal waveguide with honeycomb structure, a two-dimensional photonic crystal waveguide with triangular lattice, and two-dimensional photonic crystal waveguides with various irregular shapes.

The photonic crystal waveguide has a structure formed by removing 1 or 2 or 3 or 4 rows of the dielectric rods from the photonic crystal.

The photonic crystal waveguide plane is perpendicular to the axis of the dielectric rods in the photonic crystal.

Compared with the prior arts, the present invention has the following advantages:

(1) The structure has the advantages of small volume, high degree of polarization, high light transmission efficiency, and being suitable for large-scale optical integrated circuits;

(2) The present invention can completely realize the polarization separation function via a kind of dielectric defect rods in a small volume, thus it is convenient for optical integration and high efficient;

(3) The present invention can realize the polarization beam splitting function for different wavelengths by the method of scaling the lattice constant and other geometric parameters utilizing the scaling property of photonic crystals.

The initial signal for the photonic crystal waveguide device is inputted from the left port "1", the port "2" outputs TE light wave, "3" is the background tellurium dielectric rods, the direction of the optical axis thereof is outwards vertical to the paper plane, and the radius thereof is R=0.3568a. "4" is square dielectric defect rods, the direction of the optical axis thereof is parallel to the paper plane and perpendicular to the horizontal axis of the paper plane, and the side length of the cross section of the square dielectric defect rod is L=0.575a, and the position center thereof is consistent with the respective circle center of the background dielectric rods deleted.

Figure 2:
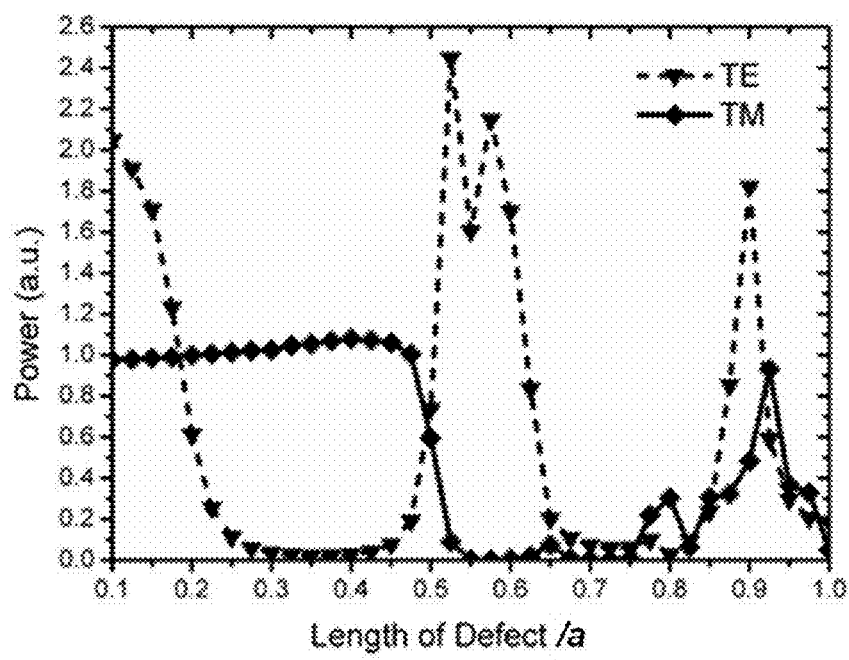

FIG. 2 is the power of TE and TM waves in the TE output channel versus the side length of the square dielectric defect rods in the waveguide of the TE polarization splitter according to the present invention.

Figure 3:
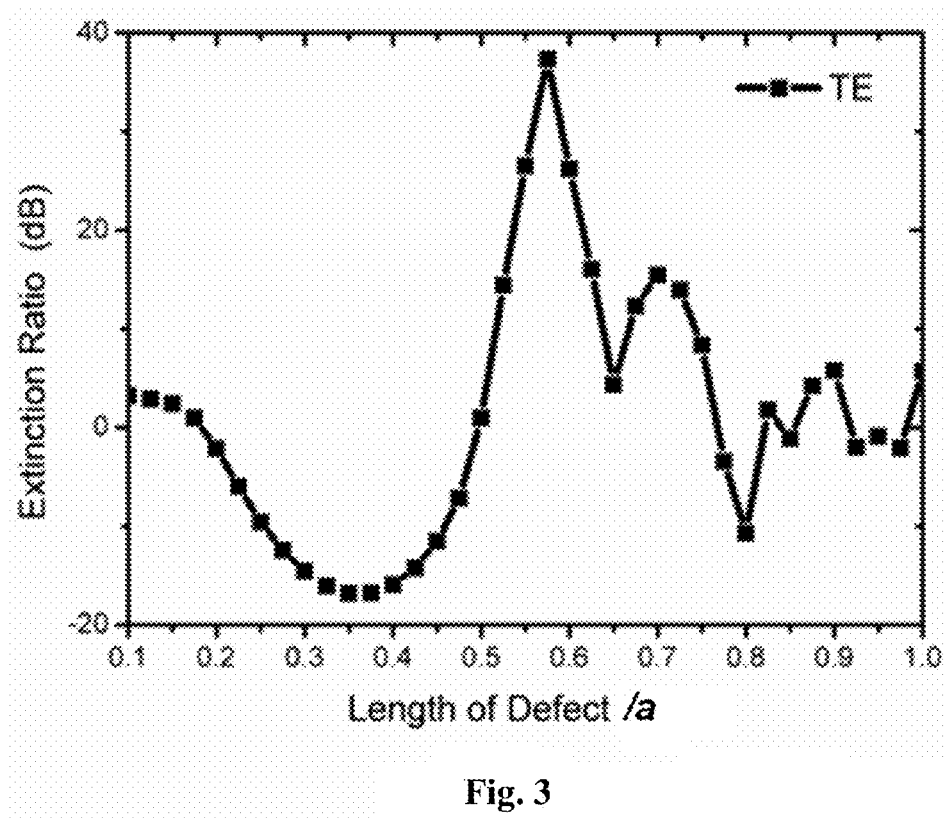

FIG. 3 is the extinction ratio of light in the TE output channel versus the side length of the square dielectric defect rods in the waveguide of the TE polarization splitter according to the present invention.

Figure 4:
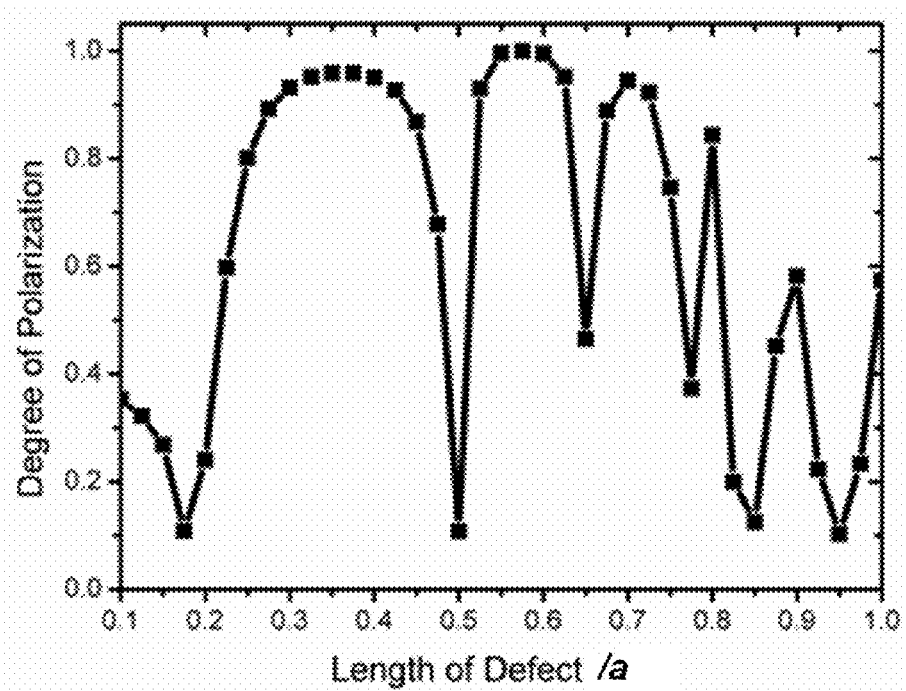

FIG. 4 is the degree of polarization of light in the TE output channel versus the side length of the square dielectric defect rods in the waveguide of the TE polarization splitter according to the present invention.

Figure 5:
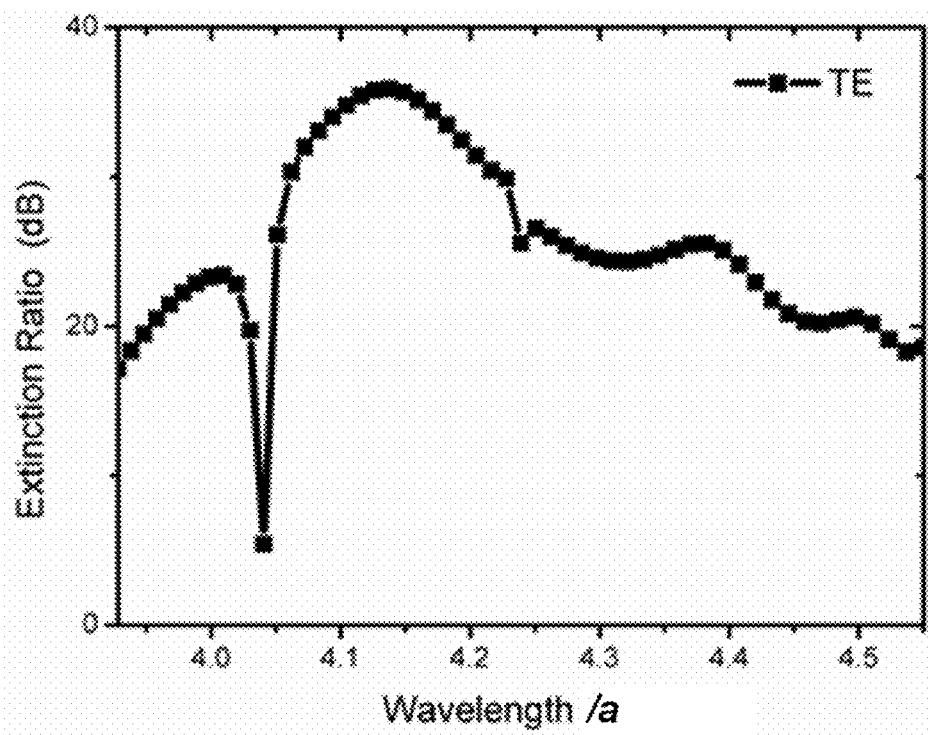

FIG. 5 is the extinction ratio of light versus wavelength in the TE output channel in the photonic bandgap region of the photonic crystal in the TE polarization splitter according to the present invention.

Figure 6:
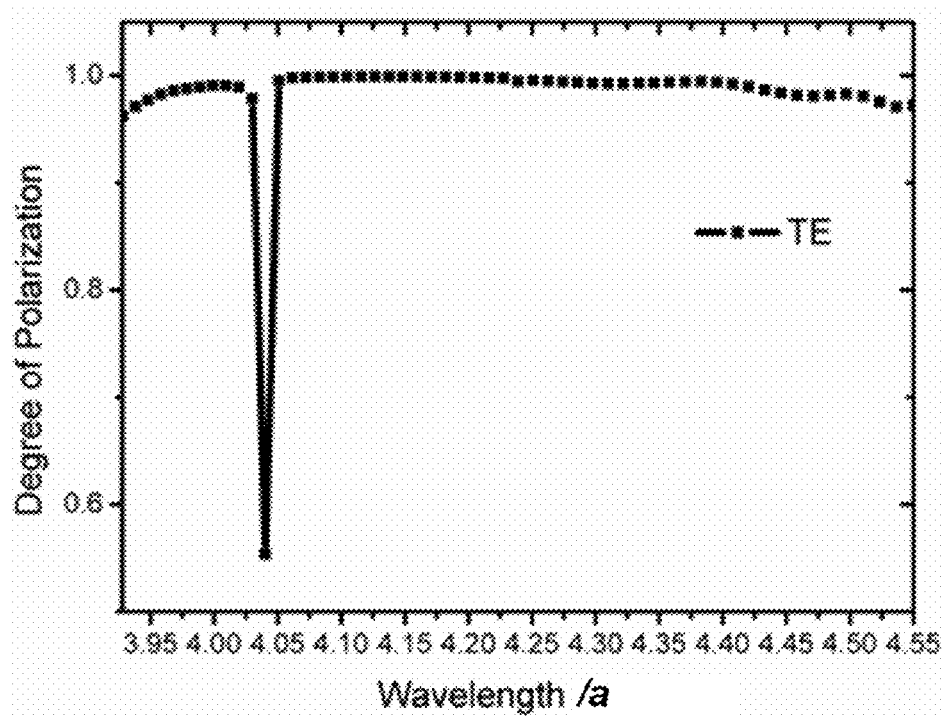

FIG. 6 is the degree of polarization of light versus wavelength in the TE output channel in the photonic bandgap region of the photonic crystal in the TE polarization splitter according to the present invention.

Figure 7:
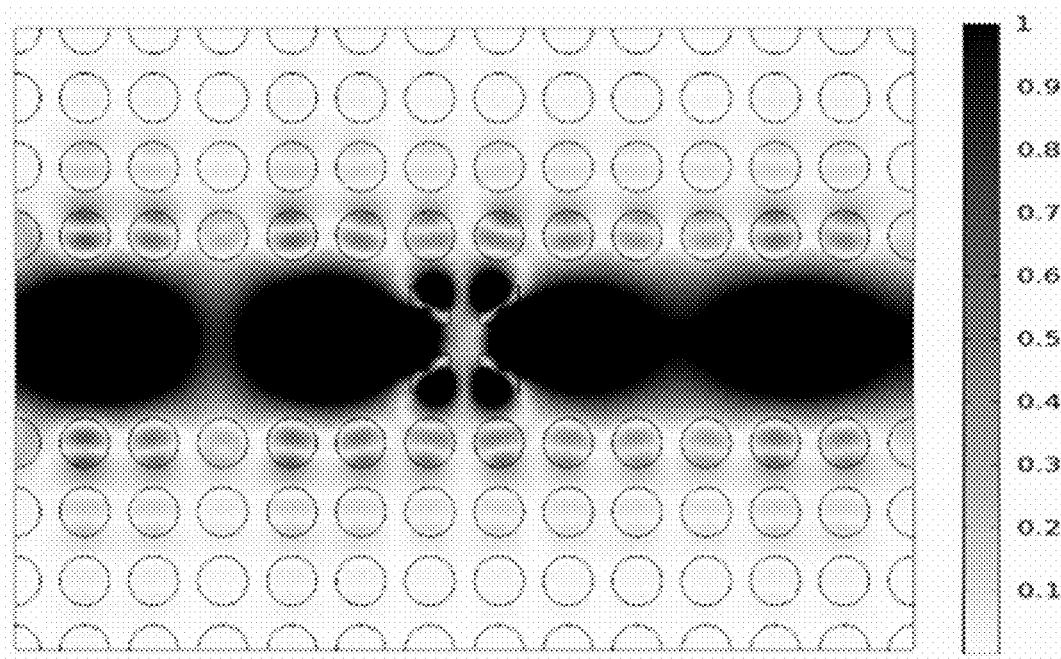

FIG. 7 is the simulated field distribution for TE waves.

Figure 8:
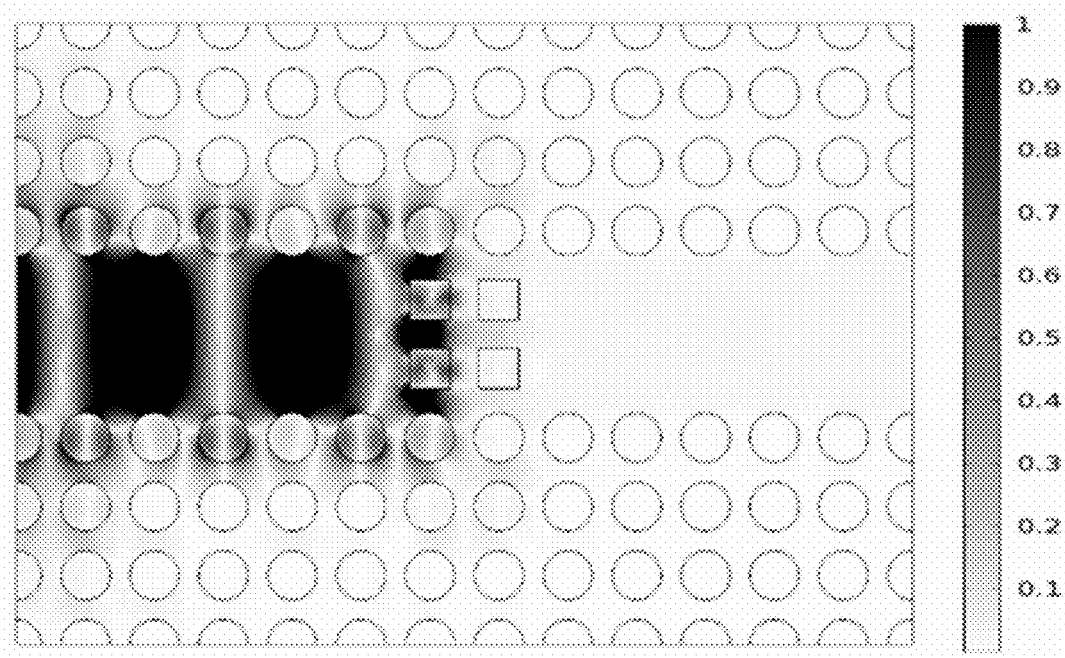

FIG. 8 is the simulated field distribution for TM waves.

DETAILED DESCRIPTION OF THE PREFERRED EMBODIMENTS

Below in connection with the accompanying drawings and specific embodiments, the present invention will be described in further detail.

The dielectric material in the principle introduction and the embodiments of the present invention is Te dielectric rod as an example. Tellurium is a uniaxial positive crystal, the refractive index for o-light thereof is $n_o$=4.8, and the refractive index for e-light is $n_e$=6.2. For the e-axis and the dielectric rod axis in the same direction, the photonic bandgap can be obtained by the plane wave expansion. For the square-lattice photonic crystal with the lattice constant being a and the radius of the rods in photonic crystal being 0.3568a, the photonic bandgap is 3.928 to 4.550 ($\omega a/2\pi c$), and the light wave with any frequency therein will be confined in the waveguide.

In the present invention, square dielectric defect rods are introduced in the waveguide, such that the equivalent refractive indexes of the defect rods for the light wave with different polarization states is different, thus the defect rods can result in one polarization state to be totally reflected and the other polarization state to be totally transmitted. The dielectric defect rods having different performance for different polarization states are applied near the end surface of the waveguide, and thus the separation of the light waves with different polarizations can be realized.

Figure 1:
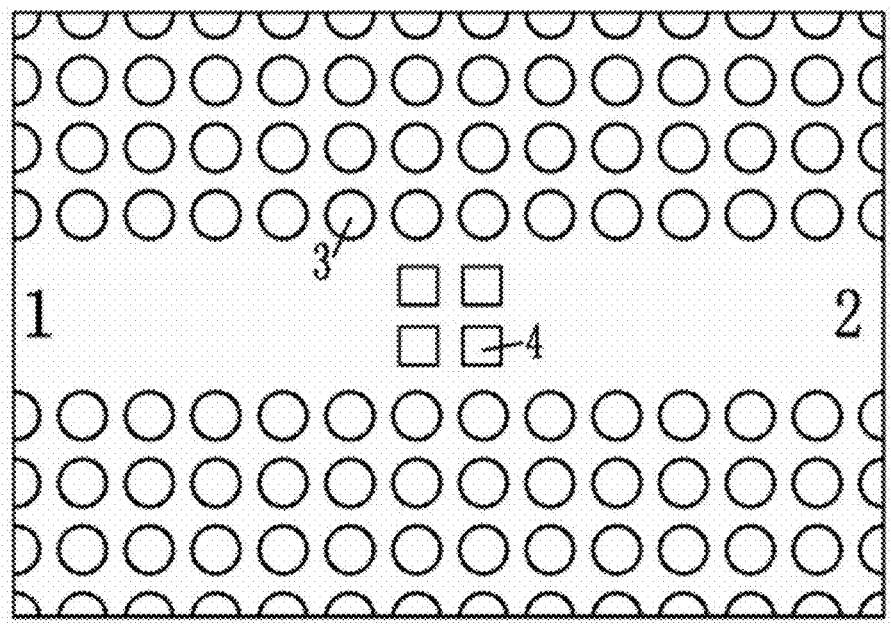
FIG. 1 is the schematic diagram, showing the structure of a Tellurium photonic crystal waveguide device used in the present invention.

As shown in FIG. 1, two lines or two rows of dielectric rods in the tellurium photonic crystal in the present invention needs to be deleted to form the waveguide for guiding light, and the width thereof is L=3a, which is the distance between the circle centers of nearest background dielectric rods on the two walls of the waveguide, wherein a is the lattice constant of the photonic crystal. The radius of the background tellurium dielectric rods in the photonic crystal is R=0.3568a. Cartesian rectangular coordinate system is used in the description, wherein the positive direction of X axis is to the right horizontally in the paper plane; the positive direction of Y axis is vertically upward in the paper plane; and the positive direction of Z axis is outward vertically to the paper plane.

The equivalent refractive indexes of the dielectric defect rods are:

$$n_{eff}^{TE} = \sqrt{\varepsilon_{eff}^{TE}}, \varepsilon_{eff}^{TE} = \frac{\int_\Omega \varepsilon_e \cdot E_z^2 d\Omega}{\int_\Omega E_z^2 d\Omega}, \varepsilon_e = n_e^2, \quad (1)$$

$$n_{eff}^{TM} = \sqrt{\varepsilon_{eff}^{TM}}, \varepsilon_{eff}^{TM} = \frac{\int_\Omega \varepsilon_o \cdot (E_x^2 + E_y^2) d\Omega}{\int_\Omega (E_x^2 + E_y^2) d\Omega}, \varepsilon_o = n_o^2, \quad (2)$$

In the equation, $n_{eff}^{TE}$ and $n_{eff}^{TM}$ represent the equivalent refractive indexes for TE and TM lights, respectively, and $E_x$, $E_y$ and $E_z$ are the x, y, z components of the electric field, respectively.

The reflection ratio (R) and the transmissivity (T) of the light wave in the waveguide due to the dielectric defect rods can be expressed as:

$$R_{TE} = \left(\frac{n_{eff}^{TE} - 1}{n_{eff}^{TE} + 1}\right)^2, \quad (3)$$

$$T_{TE} = \frac{4 n_{eff}^{TE}}{(n_{eff}^{TE} + 1)^2},$$

$$R_{TM} = \left(\frac{n_{eff}^{TM} - 1}{n_{eff}^{TM} + 1}\right)^2, \quad (4)$$

$$T_{TM} = \frac{4 n_{eff}^{TM}}{(n_{eff}^{TM} + 1)^2}.$$

As shown in FIG. 1, in the four square dielectric defect rods, the center of each square dielectric defect rod is consistent with the center of the round dielectric rod which was originally deleted to form the waveguide, so that the four square tellurium dielectric defect rods are arranged in square, and the distance between the centers of two nearest squares is a, the distance between the center of the square dielectric defect-rod and that of the nearest background dielectric rod is also a, and the side length of each square dielectric defect rod is 0.575a. The optical axis of the four square tellurium dielectric defect rods is perpendicular to the optical axis of the background cylinder tellurium dielectric rods in the photonic crystal.

For the waveguide with the above defects introduced, the incident signal port is at the position "1" in FIG. 1. Light is propagated in the waveguide formed by the array of "3" dielectric rods, after the light arrives at the defect position "4", the TE wave is totally transmitted, and the TM wave is totally isolated. After the signal acted with the defect rods, the TE wave will be finally outputted at the position "2" of the output port. For different input signals, the selection functions are provided as follows:
 (1) For the incident light of mixed TE and TM waves, the TE wave is totally exported from the right-hand-side of the waveguide, and the TM wave is totally isolated.
 (2) For the incident light of only TE wave, the TE wave is exported from the right-hand side of the waveguide.
 (3) For the incident light of only TM wave, TM wave can't be brought into the right-hand side of the waveguide.

The lattice constant and the operating wavelength can be determined by the following ways. According to the refractive index curve of the uniaxial crystal tellurium, tellurium has a relative stable refractive index in the wavelength range between 3.5a~35a. By the equation $$f = \frac{\omega a}{2\pi c} = \frac{a}{\lambda}, \quad (5)$$

wherein f is the photonic bandgap frequency, and the normalized photonic bandgap frequency range of the square-lattice tellurium photonic crystal in the present invention $$f=0.21977 \to 0.25458, \quad (6)$$

the corresponding photonic bandgap wavelength range is calculated as:

$$\lambda=3.928a \sim 4.55a. \quad (7)$$

Thus, it can be seen that, by varying the value of the lattice constant a, the required wavelength $\lambda$ proportional to the lattice constant can be acquired.

The extinction ratio in the waveguide is defined as:

$$\text{Extinction Ratio}_{TE} = 10 \times \log_{10}\left(\frac{I_{TE}}{I_{TM}}\right), \text{ for TE wave}, \quad (8)$$

$$\text{Extinction Ratio}_{TM} = 10 \times \log_{10}\left(\frac{I_{TM}}{I_{TE}}\right), \text{ for TM wave}. \quad (9)$$

The degree of polarization is defined as:

$$\text{Degree of Polarization}_{TE} = \left|\frac{I_{TE} - I_{TM}}{I_{TE} + I_{TM}}\right|, \text{ for TE wave}, \quad (10)$$

$$\text{Degree of Polarization}_{TM} = \left|\frac{I_{TM} - I_{TE}}{I_{TM} + I_{TE}}\right|, \text{ for TM wave}. \quad (11)$$

FIG. 2 shows the output power of different TE and TM light waves versus the side length of the four square dielectric defect rods. For the side length in the range of 0.51a-0.6a. The TE wave has a maximum of output power.

As shown in FIGS. 3 and 4, by simultaneously adjusting the side length of square dielectric defect rods, we can have, $R_{TE}\approx0$, $T_{TE}\approx1$ and $R_{TM}\approx1$, $T_{TM}\approx0$, i.e., the function of isolating TM light and transmitting TE light is realized. (Here, the direction of the e-axis of the square dielectric defect rods is in the horizontal y axis.)

According to FIG. 3, for the side length of the square dielectric defect rods in the range of 0.55a-0.6a, the TE wave has a maximum extinction ratio, i.e., the maximum extinction ratio is 37.3 dB for the side length of 0.575a of the square dielectric defect rods. According to FIG. 4, for the side length of the square dielectric defect rods in the range of 0.55a-0.6a, the TE wave has the degree of polarization larger than 0.995, e.g., for the side length of 0.575a of the square dielectric defect rods, the degree of polarization is 0.9996. By considering FIGS. 3 and 4 together, it can be derived that for the TE wave having both maximum extinction ratio and high degree of polarization, the side length of the square dielectric defect rods is $$L_{defect}=0.575a. \quad (12)$$

In this case, we have $n_{eff}^{TE}\rightarrow1$, $n_{eff}^{TM}\rightarrow\infty$.

From FIG. 5, it can be found that for the operating wavelength in 3.928a-4.55a, all of the extinction ratios for TE wave at the output port are larger than 17 dB except the range of 4.032a-4.046a. For the wavelength of 4.1375a, the extinction ratio has a maximum value of 35.885 dB. And the extinction ratio has a minimum value of 5.4 dB in the range of 4.032a-4.046a.

From FIG. 6, it can be found that for the operating wavelength in 3.928a-4.55a, all of the degrees of polarization for TE wave at the output port are larger than 0.96 except for the range of 4.032a-4.046a. And in the range of 4.032a-4.046a, the degree of polarization has a minimum value of 0.55. Thus, the operating wavelength is not suitable to be chosen in the range of 4.032a-4.046a.

By considering FIGS. 5 and 6 together with the above analysis, it can be found that the TE polarization splitter function of the present invention can be realized very well using all of the light waves in the wavelength band of 3.928a-4.55a except a narrow wavelength band of 4.032a-4.046a, which shows that the present invention has a large operating wavelength range, which is not available for other polarization beam splitting devices based on coupling of cavity modes.

FIGS. 7 and 8 are the light field diagrams calculated by finite element software COMSOL for the operating wavelength of 4.1a in free space. It can be observed that the TE light propagates with a high transmittance while the TM light is entirely isolated, so it has an extremely high extinction ratio.

The direction of the e-axis of the four square dielectric defect rods in the waveguide transmitting TE is different from that of the background dielectric rods—the direction of the e-axis of the four square dielectric defect rods is parallel to the Y axis, while the e-axis of the background rods is parallel to the Z axis. Since the directions of the e-axis of the square dielectric defect rods and the background dielectric rods are different, the shape of the defect is designed as a square to ensure linear influence for the waveguide, and to reduce manufacture difficulty at the same time. The present invention can effectively separate light waves comprising both TE and TM components in a short distance.

The present invention has a high extinction ratio and meanwhile has a broad operating wavelength range, which allows the pulses with a certain frequency spectrum width, or Gauss-pulse light, or light with different wavelengths, or light with multiple wavelengths to operate at the same time, and is useful in practice.

The present invention may establish a square-lattice tellurium photonic crystal—a uniaxial positive crystal tellurium array in a square lattice arrangement on a substrate. In the present invention, both TE and TM lights can propagate in a fundamental mode in the photonic crystal waveguide formed by deleting two lines or two rows at the center of the photonic crystal. The e-light optical axis of each rod in the background tellurium dielectric rods in the photonic crystal must satisfy that it is consistent with the direction of the axis of the cylinder. The operating wavelength can be adjusted by the lattice constant of the photonic crystal. But the selection of the operating wavelength can not exceed a stable linear range of the refractive index.

The above embodiment and application range of the present invention can be improved, and should not be understood as the limit of the invention.

What is claimed is:

1. A TE-polarization splitter based on a photonic crystal waveguide, comprising a waveguide formed in a photonic crystal with a complete photonic bandgap, after the incident wave with any polarization direction is inputted into the polarization splitter via the input port of the photonic crystal waveguide, TE wave is outputted from the output port of the polarization splitter, while the TM wave is reflected from the input port of the polarization splitter, wherein said photonic crystal waveguide is provided with the waveguide-defect dielectric rods, and the defect dielectric rods are four square shaped defect dielectric rods, in which the center of each square shaped dielectric rod coincides with the center of circular shaped dielectric rod which was originally deleted in forming the waveguide.

2. The TE-polarization splitter based on a photonic crystal waveguide according to claim 1, wherein the refractive index for the e-light is more than that for the o-light in the dielectric defect rods in waveguide, and the optical axis of the dielectric defect rods in the waveguide is parallel to the photonic crystal waveguide plane and orthogonal to the propagating direction of the wave.

3. The TE-polarization splitter based on a photonic crystal waveguide according to claim 1, wherein the photonic crystal waveguide is a two-dimensional photonic crystal waveguide, and includes a two-dimensional photonic crystal waveguide with tellurium dielectric material, a two-dimensional photonic crystal waveguide with honeycomb structure, a two-dimensional photonic crystal waveguide with triangular lattice, or two-dimensional photonic crystal waveguides with various irregular shapes.

4. The TE-polarization splitter based on a photonic crystal waveguide according to claim 1, wherein the photonic crystal waveguide has a structure formed by removing 1 or 2 or 3 or 4 rows of the dielectric rods from the photonic crystal.

5. The TE-polarization splitter based on a photonic crystal waveguide according to claim 1, wherein the photonic crystal waveguide plane is perpendicular to the axis of the dielectric rods in the photonic crystal.

* * * * *